United States Patent
Miyata et al.

(10) Patent No.: US 12,328,514 B2
(45) Date of Patent: Jun. 10, 2025

(54) IMAGE PROCESSING DEVICE, AND IMAGE PROCESSING METHOD

(71) Applicant: HONDA MOTOR CO., LTD., Tokyo (JP)

(72) Inventors: Takashi Miyata, Tokyo (JP); Taiki Yamada, Tokyo (JP); Tomoaki Hagihara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 195 days.

(21) Appl. No.: 18/177,264

(22) Filed: Mar. 2, 2023

(65) Prior Publication Data
US 2023/0328393 A1  Oct. 12, 2023

(30) Foreign Application Priority Data
Mar. 17, 2022 (JP) .................................. 2022-042098

(51) Int. Cl.
*H04N 23/80* (2023.01)
*G03B 17/56* (2021.01)
(Continued)

(52) U.S. Cl.
CPC .............. *H04N 23/80* (2023.01); *G03B 17/56* (2013.01); *G06F 16/4393* (2019.01);
(Continued)

(58) Field of Classification Search
CPC .. H04N 23/80; H04N 23/6811; H04N 9/8205; G03B 17/56; G06F 16/4393;
(Continued)

(56) References Cited

U.S. PATENT DOCUMENTS

2003/0190142 A1  10/2003 Togashi et al.
2005/0278111 A1* 12/2005 Ujino .................... G01C 21/20
                                            701/440
(Continued)

FOREIGN PATENT DOCUMENTS

JP    2003-274352 A    9/2003
JP    2006-109151 A    4/2006
(Continued)

OTHER PUBLICATIONS

Japanese Office Action dated Nov. 14, 2024, Japanese Application No. 2022-042098, English translation included, 10 pages.
(Continued)

*Primary Examiner* — Lin Ye
*Assistant Examiner* — Steven Daniel Barry
(74) *Attorney, Agent, or Firm* — Rankin, Hill & Clark LLP

(57) ABSTRACT

An image processing device includes: a captured image acquisition unit for acquiring a plurality of captured images photographed with a photographic device; a music playback information acquisition unit for acquiring music playback information that is information about music being played during photographing of the captured images; and a captured image selection unit for highlight scene, for selecting, from among the plurality of captured images, based on the music playback information, captured images that were photographed when music meeting a predetermined music condition was being played.

7 Claims, 4 Drawing Sheets

(51) Int. Cl.
*G06F 16/438* (2019.01)
*G06F 18/22* (2023.01)
*G06F 18/30* (2023.01)
*G06T 7/00* (2017.01)
*H04N 23/68* (2023.01)

(52) U.S. Cl.
CPC .............. *G06F 18/22* (2023.01); *G06F 18/30* (2023.01); *G06T 7/0002* (2013.01); *H04N 23/6811* (2023.01)

(58) Field of Classification Search
CPC ........ G06F 18/22; G06F 18/30; G06F 16/435; G06F 16/739; G06F 16/433; G06F 16/434; G06T 7/0002; G06V 20/30; G11B 27/031; G11B 31/00
See application file for complete search history.

(56) References Cited

U.S. PATENT DOCUMENTS

| | | | |
|---|---|---|---|
| 2009/0291707 A1 | 11/2009 | Choi | |
| 2012/0251082 A1* | 10/2012 | De Vos | H04N 9/8211 386/E5.028 |
| 2014/0078331 A1* | 3/2014 | McMahon | H04N 9/8063 348/211.99 |
| 2014/0215342 A1 | 7/2014 | Watanabe et al. | |
| 2014/0226035 A1* | 8/2014 | Nurmenniemi | H04N 5/76 348/231.2 |
| 2017/0134688 A1 | 5/2017 | Yoon et al. | |
| 2018/0173995 A1 | 6/2018 | Mitsumoto | |
| 2018/0232369 A1* | 8/2018 | Takeuchi | G06F 16/54 |
| 2020/0134456 A1* | 4/2020 | Li | H04N 21/84 |
| 2020/0329211 A1 | 10/2020 | Jeong et al. | |
| 2021/0362688 A1* | 11/2021 | Kawamura | B60S 1/486 |
| 2022/0358966 A1* | 11/2022 | Wang | H04N 21/8106 |

FOREIGN PATENT DOCUMENTS

| | | | |
|---|---|---|---|
| JP | 2012-182724 A | 9/2012 | |
| JP | 2014-085644 A | 5/2014 | |
| JP | 2014-147025 A | 8/2014 | |
| JP | 2015-031885 A | 2/2015 | |
| JP | 2015-032846 A | 2/2015 | |
| JP | 2018-101914 A | 6/2018 | |
| JP | 2018-132906 A | 8/2018 | |
| JP | 2021-101525 A | 7/2021 | |
| JP | 2021-101530 A | 7/2021 | |
| WO | WO-2022096113 A1 * | 5/2022 | ......... G06Q 30/0251 |

OTHER PUBLICATIONS

"The research concerning reconstruction of the recorded video image for improvement and automobile sightseeing experience", The 21st Annual Conference of the Virtual Reality Society of Japan, Convention collected papers, Sep. 2016, 5 pages.

* cited by examiner

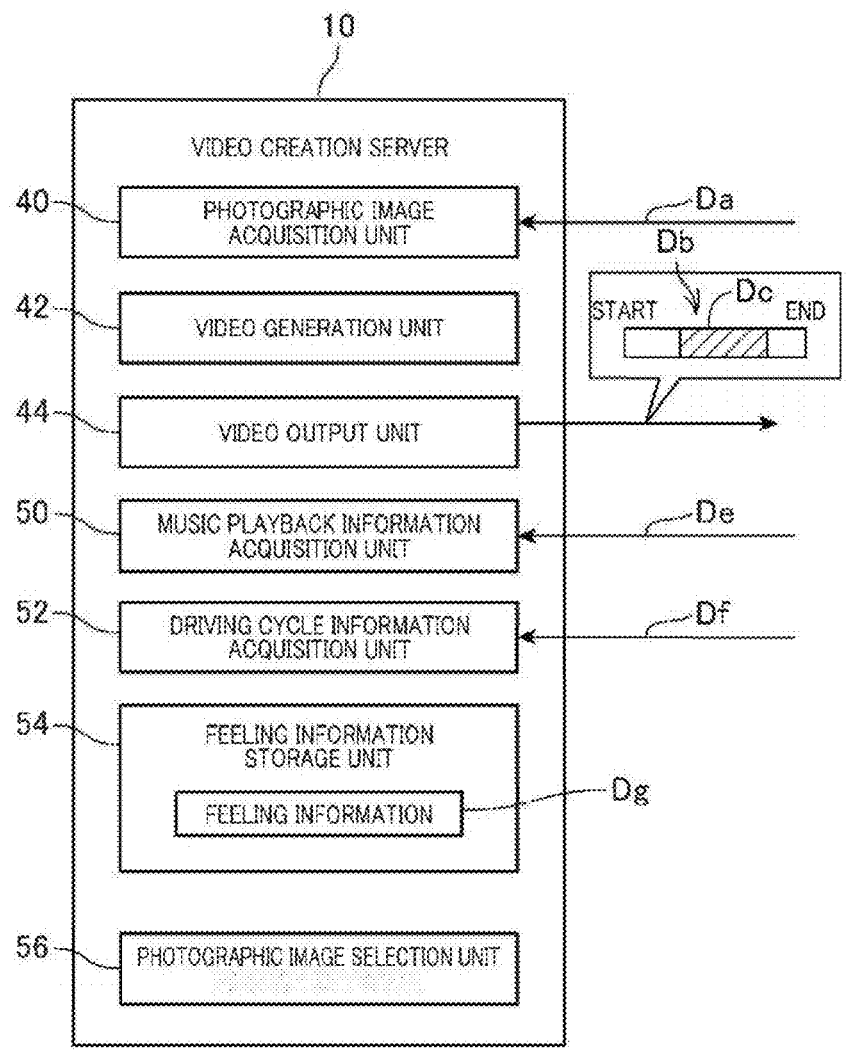

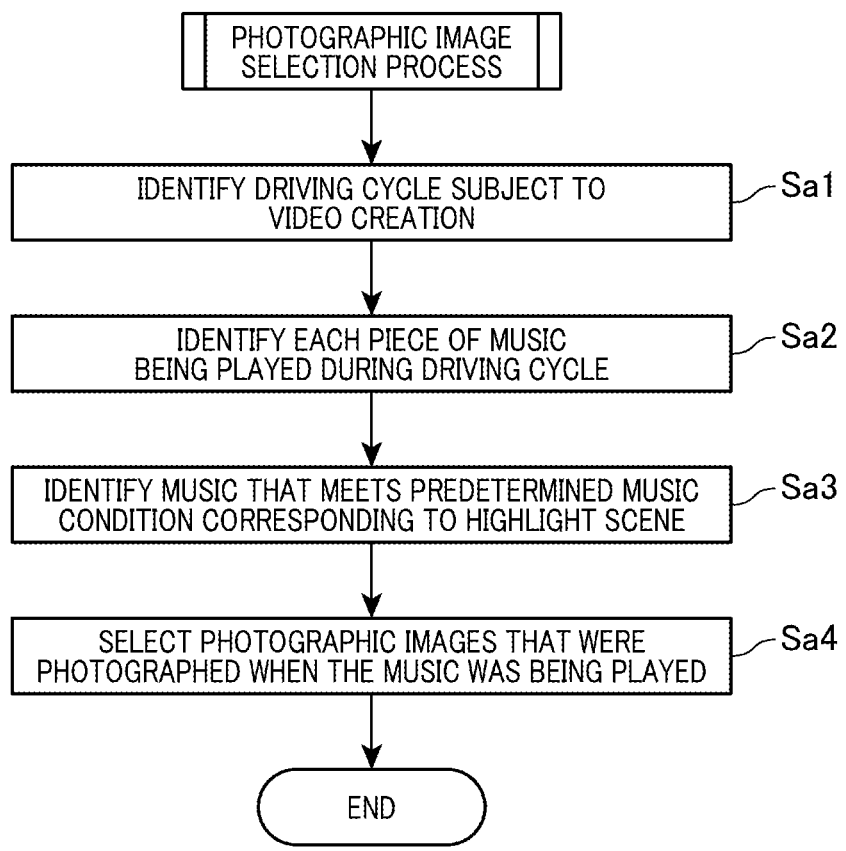

IMAGE PROCESSING DEVICE, AND IMAGE PROCESSING METHOD

INCORPORATION BY REFERENCE

The present application claims priority under 35 U.S.C. § 119 to Japanese Patent Application No. 2022-042098 filed on Mar. 17, 2022. The content of the application is incorporated herein by reference in its entirety.

BACKGROUND OF THE INVENTION

Field of the Invention

The present invention relates to an image processing device, and an image processing method.

Description of the Related Art

There is a known technique that, on the basis on a plurality of photographic images photographed with a photographic device, reproduces the photographic images as a slideshow video (see, for example, Japanese Patent Laid-Open No. 2018-101914).

Moreover, there is a proposed technique that aims to allow a user to select photographic images for use in a slideshow by a more simple, efficient operation (see, for example, Japanese Patent Laid-Open No. 2014-147025).

However, in the technique of Japanese Patent Laid-Open No. 2014-147025, if there are many candidate photographic images when the user selects photographic images, the burden for selecting the photographic images becomes heavier.

Note that, when captured images are videos instead of images, a similar problem arises when creating one video using a large number of captured videos.

The purpose of the present invention is to provide an image processing device, and an image processing method that make it possible to automatically select suitable captured images, and reduce the burden on the user.

SUMMARY OF THE INVENTION

One aspect of the present invention is an image processing device including: a captured image acquisition unit for acquiring a plurality of captured images photographed with a photographic device; a music playback information acquisition unit for acquiring music playback information that is information about music being played during photographing of the captured images; and a captured image selection unit for highlight scene, for selecting, from among the plurality of captured images, based on the music playback information, captured images that were photographed when music meeting a predetermined music condition was being played.

One aspect of the present invention is that, in the image processing device, the predetermined music condition includes a condition related to feeling information about a feeling that a person listening to the music gets.

One aspect of the present invention is that, in the image processing device, the captured image selection unit for highlight scene determines the predetermined music condition, based on information about a situation during the photographing.

One aspect of the present invention is that, in the image processing device, the predetermined music condition includes a condition related to information identified based on a playback history of music being played during the photographing.

One aspect of the present invention is that, in the image processing device, the predetermined music condition includes a condition related to a degree of deviation between the music being played during the photographing and a music preference of a user listening to the music during the photographing.

One aspect of the present invention is that, in the image processing device, the photographic device is mounted on a moving object, and the music during the photographing is music being played in the moving object.

One aspect of the present invention is that, in the image processing device, the captured image selection unit for highlight scene selects captured images from among the captured images that were photographed during one cycle of a driving cycle of the moving object.

One aspect of the present invention is that, in the image processing device, the predetermined music condition includes a condition that the music being played during the photographing is music selected based on movement information about a movement of the moving object.

One aspect of the present invention is that, in the image processing device, the predetermined music condition includes a condition that a degree of matching between the music being played during the photographing and the movement information about the moving object is equal to or greater than a predetermined value.

One aspect of the present invention is the image processing device having a video generation unit for generating a video, based on the captured images selected by the captured image selection unit for highlight scene.

One aspect of the present invention is an image processing method to be performed by an image selection device having a captured image acquisition unit for acquiring a plurality of captured images photographed with a photographic device, the image processing method including: a step for acquiring music playback information that is information about music being played during photographing of the captured images; and a step for selecting, from among the plurality of captured images, based on the music playback information, captured images that were photographed when music meeting a predetermined music condition was being played.

According to one aspect of the present invention, it is possible to automatically select suitable captured images, and reduce the burden on the user.

BRIEF DESCRIPTION OF THE DRAWINGS

FIG. 3 is a view showing a functional configuration of a video creation server; and FIG. 4 is a flowchart of a photographic image selection process.

DETAILED DESCRIPTION OF THE PREFERRED EMBODIMENT

Hereinafter, an embodiment of the present invention will be described with reference to the drawings. Note that the following embodiment presents an example in which a captured image is an image.

Figure 1:
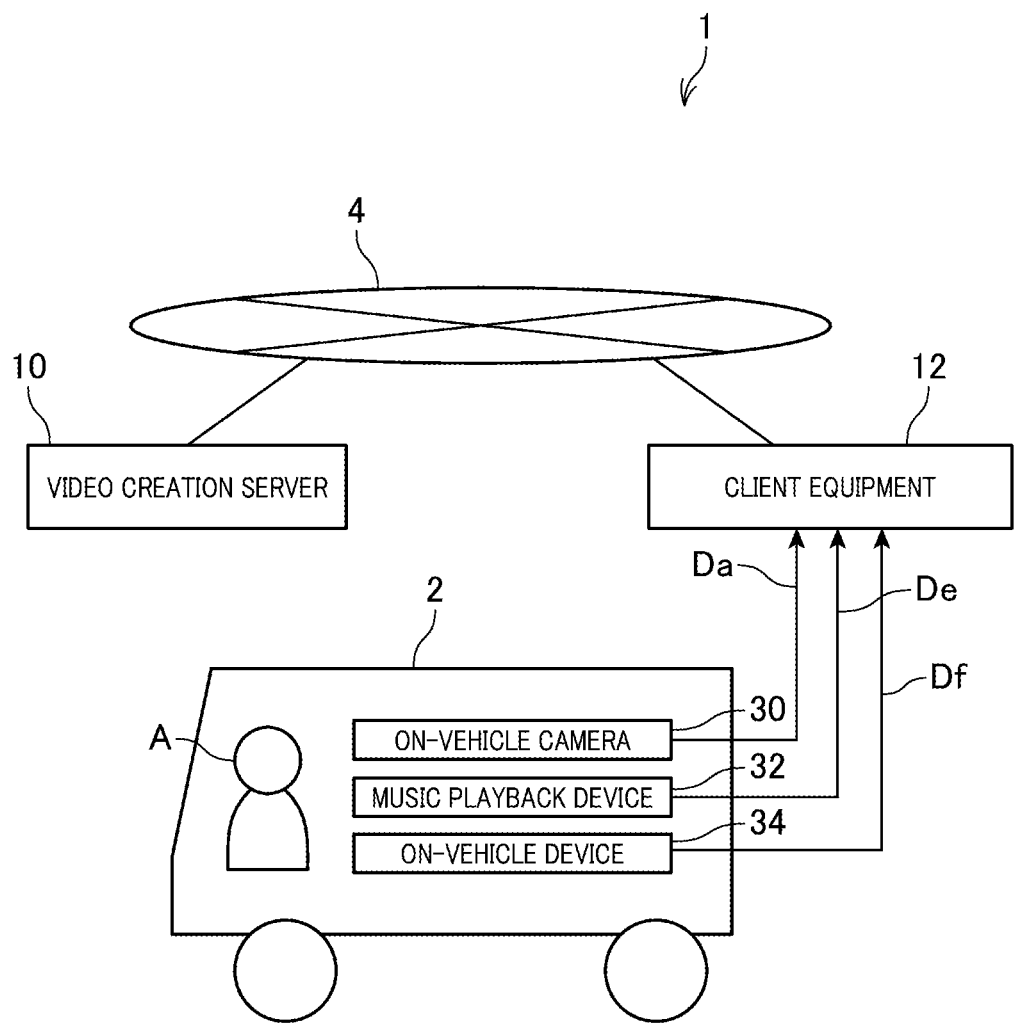
FIG. 1 is a view showing a configuration of a video creation system according to an embodiment of the present invention.

FIG. 1 is a view showing a configuration of a video creation system 1 according to the present embodiment.

The video creation system 1 includes: a video creation server 10 that provides a video creation service through a telecommunication line 4 such as the Internet; and client equipment 12 for a user A to use the video creation service.

The video creation server 10 is a server computer that realizes the video creation service by receiving an input of photographic images Da from the client equipment 12, and creating a video Db based on the photographic images Da. Note that the video Db may contain audio data, such as music, in addition to visual data (frame data).

Moreover, the video creation server 10 has a function to serve as an image processing device for executing a photographic image selection process. The photographic image selection process is a process for automatically selecting, from a plurality of photographic images Da input from the client equipment 12, a photographic image Da for use in a highlight scene Dc in the video Db. By executing the photographic image selection process, the video creation server 10 reduces a burden required for the user A to create the video. Furthermore, during automatic selection of photographic images Da in the photographic image selection process, the video creation server 10 selects photographic images Da that were photographed when music meeting a predetermined music condition preset for the highlight scene Dc was being played. Thus, photographic images Da suitable for the highlight scene Dc are automatically selected.

The video creation system 1 of the present embodiment is a system suitable for use in creating a memory video for a drive, using the photographic images Da photographed during the drive, after the user A rode a vehicle 2 (FIG. 1) and enjoyed driving. Specifically, the video Db contains the highlight scene Dc of the drive, and the photographic images Da for use in the highlight scene Dc are automatically selected by the video creation server 10.

The client equipment 12 and the video creation server 10 of the video creation system 1 will be described in further detail below.

Figure 2:
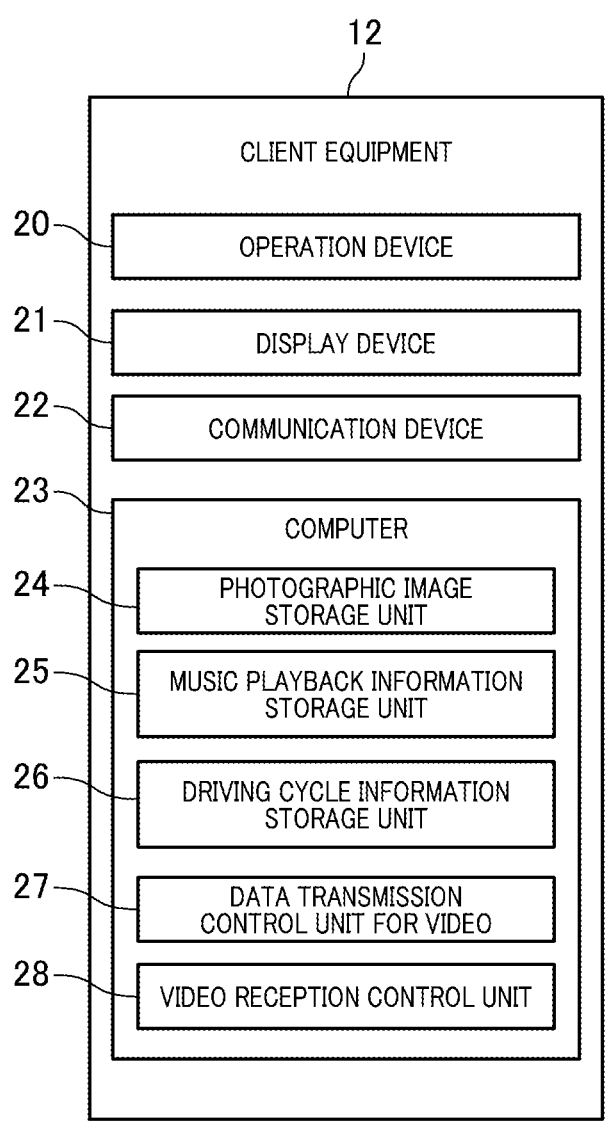
FIG. 2 is a view showing a functional configuration of client equipment.

FIG. 2 is a view showing a functional configuration of the client equipment 12 according to the present embodiment.

The client equipment 12 is, for example, a smartphone, a notebook personal computer, a stationary personal computer or the like, and includes an operation device 20, a display device 21 (display), a communication device 22, and a computer 23.

The operation device 20 is a device, such as a button, a touch panel, and a keyboard, for receiving an operation from the user A. The display device 21 is a device for displaying various kinds of information. Examples of the information are photographic images Da, video Db, etc. The communication device 22 is a device that includes a transmitter and a receiver, and communicates with the video creation server 10 through the telecommunication line 4.

The computer 23 includes: a processor such as a central processing unit (CPU) and a micro-processing unit (MPU); a memory device (which is also called a main storage device), such as a read only memory (ROM) and a random access memory (RAM); a storage device (which is also called a sub storage device), such as a hard disk drive (HDD) and a solid state drive (SSD); and an interface circuit for connecting peripheral devices (such as the operation device 20, the display device 21, and the communication device 22). Further, the processor functions as a client computer of the video creation server 10 by executing a computer program stored in the memory device or the storage device.

Specifically, the computer 23 includes a photographic image storage unit 24, a music playback information storage unit 25, a driving cycle information storage unit 26, a data transmission control unit 27 for video, and a video reception control unit 28 as a functional configuration.

The photographic image storage unit 24 stores a large number of photographic images Da as material for the video Db, the music playback information storage unit 25 stores later-described music playback information De, and the driving cycle information storage unit 26 stores later-described driving cycle information Df.

These photographic images Da, music playback information De, and driving cycle information Df are data fetched into the client equipment 12 from another device through the interface circuit or the communication device 22.

In the present embodiment, the photographic images Da are images captured with a later-described on-vehicle camera 30, which is one example of the photographic device, when the user A was traveling in the vehicle 2 (FIG. 1).

The music playback information De is information about music that was being played in the surroundings of the on-vehicle camera 30 when the photographic images Da were photographed, and listened by the user A during the photographing. In the present embodiment, the music playback information De contains information about a music playback history, and specifically contains music identification information De1 that uniquely identifies music, and playback date and time De2 as information that enables identifying the timing when the music was being played.

The driving cycle information Df is information related to a driving cycle of the vehicle 2, and contains at least a start date and time Df1 and an end date and time Df2 of the driving cycle. Note that the driving cycle is a period in which the user A used the vehicle 2 for moving from a start point to a destination point, and, for example, it is possible to use a period from operating a start switch for activating a power source of the vehicle 2 to the next time when operating the start switch again, which is set as one cycle.

In order to obtain these photographic images Da, music playback information De, and driving cycle information Df, the vehicle 2 is provided with the on-vehicle camera 30, a music playback device 32, and an on-vehicle device 34 as shown in FIG. 1.

The on-vehicle camera 30 is a photographic device that is mounted on the vehicle 2, photographs the surroundings or interior of the vehicle 2, and keeps a large number of photographic images Da. These photographic images Da are fetched into the client equipment 12. Note that photographing may be performed either manually by the user A, or by automatic photography.

The music playback device 32 is a device for playing back various types of music in the cabin of the vehicle 2. The music playback device 32 of the present embodiment keeps the music playback information De, and, every time a piece of music is played back, records the music identification information De1 and the playback date and time De2 of the piece of music in the music playback information De. This music playback information De is fetched into the client equipment 12.

The on-vehicle device 34 is a device for recording the driving cycle information Df, and is, for example, a vehicle control electronic control unit (ECU) (computer including a processor) for controlling the traveling of the vehicle 2. Every time the start switch of the vehicle 2 is operated, the on-vehicle device 34 of the present embodiment records the start date and time Df1, or Df2 of the driving cycle in the driving cycle information Df. This diving cycle information Df is fetched into the client equipment 12.

Returning to FIG. 2, in the client equipment 12, the data transmission control unit 27 for video executes control for transmitting data for use in creating a video from the communication device 22 to the video creation server 10, based on the operation by the user A. The data contains at least a large number of photographic images Da as material for the video Db, the music playback information De, and the driving cycle information Df.

The video reception control unit 28 executes control for receiving the video Db, which is created and output from the video creation server 10, by the communication device 22. By displaying the video Db on the display device 21, the video Db is watched by the user A.

FIG. 3 is a view showing a functional configuration of the video creation server 10.

The video creation server 10 has a computer including: a processor; a memory device (which is also called a main storage device); a storage device (which is also called a sub storage device); a communication device (a receiver and a transmitter) for communications through the telecommunication line 4; and an interface circuit for connecting various kinds of peripheral equipment. Further, the processor realizes various functions related to a video creation service by executing a computer program stored in the memory device or the storage device. Note that the video creation server 10 may include a plurality of computers, and the computers may realize the functions related to the video creation service in cooperation with each other.

The video creation server 10 includes a photographic image acquisition unit 40, a video generation unit 42, and a video output unit 44 as the functional configuration related to the video creation device for creating a video Db based on photographic images Da.

The photographic image acquisition unit 40 acquires a plurality of photographic images Da as material for a video Db. The photographic images Da acquired by receiving them from the client equipment 12 by the communication device.

The video generation unit 42 generates visual data (frame data), based on the photographic images Da, and thereby generates, for example, a slide show video Db. As a method for generating the video Db from the photographic images Da, an appropriate publicly known, or well-known method can be used.

The video output unit 44 transmits the video Db generated by the video generation unit 42 to the client equipment 12.

Note that the video generation unit 42 may add audio data such as music to the visual data (frame data). For the audio data, it is possible to use music specified by the user A, or music automatically selected by the video generation unit 42, based on information about the photographic image Da (such as the subject, the photographed location, and the date and time of capture).

Here, the video Db generated by the video generation unit 42 contains one or a plurality of highlight scenes Dc (one in the present embodiment), and, as described above, at least photographic images Da for use in the highlight scene Dc are automatically selected by the video creation server 10, instead of the user A. In other words, the video creation server 10 includes, as shown in FIG. 3, a music playback information acquisition unit 50, a driving cycle information acquisition unit 52, a feeling information storage unit 54, and a photographic image selection unit 56 for highlight scene as the functional configuration equivalent to an image processing device for executing a process of selecting the photographic images Da.

The music playback information acquisition unit 50 acquires the music playback information De, and the driving cycle information acquisition unit 52 acquires the driving cycle information Df. The music playback information De and driving cycle information Df are acquired by receiving the information from the client equipment 12 by the communication device.

The feeling information storage unit 54 stores feeling information Dg about a feeling that a person listening to the music gets. More specifically, the information recorded in the feeling information Dg is information including an emotion, an impulse, and a desire that the person feels from the tone, mood, and lyrics of the music. For example, words that relate to feelings, such as "amusing", "exciting", "cheerful", "refreshing", "solemn", "sea bathing", and "snow scenery" are recorded in the feeling information Dg. Note that the feeling information Dg may be information (for example, a word in the lyrics, the content of the lyrics, the melody, and the mood of music) that causes the person to get the feeling.

The photographic image selection unit 56 for highlight scene selects a photographic image Da for use in the highlight scene Dc, based on the music playback information De and the driving cycle information Df.

An operation of selecting the photographic image Da by the photographic image selection unit 56 for highlight scene will be described in detail below.

FIG. 4 is a flowchart of a photographic image section process.

First, the photographic image selection unit 56 for highlight scene identifies, based on the driving cycle information Df, a driving cycle corresponding to a drive specified by the user A (that is a drive subject to creation of a memory video) (step Sa1).

Next, the photographic image selection unit 56 for highlight scene identifies, based on the music playback information De, music being played during the driving cycle identified in step Sa1 (step Sa2).

Specifically, the photographic image selection unit 56 for highlight scene identifies, based on the driving cycle information Df, the start date and time Df1 and the end date and time Df2 of the driving cycle. Further, the photographic image selection unit 56 for highlight scene identifies, based on the music playback information De, music that has the playback date and time De2 in the period between the start date and time Df1 and the end date and time Df2.

Next, the photographic image selection unit 56 for highlight scene identifies music that meets a predetermined music condition preset for the highlight scene Dc, among pieces of music identified in step Sa2 (step Sa3).

More specifically, the predetermined music condition in step Sa3 is a condition set based on a feeling that the content of the highlight scene Dc can give a viewer.

For example, the highlight scene Dc is a scene containing an exciting content in the video Db, and therefore it can be said that the highlight scene Dc is a scene that makes the viewer have a feeling relating to an "uplifting mood".

Then, for the predetermined condition for the highlight scene Dc, "music that makes a listener feel an uplifting mood" is preset.

Moreover, in step Sa3, the photographic image selection unit 56 for highlight scene of the present embodiment determines whether the music during the photographing meets the predetermined music condition, based on the feeling information Dg corresponding to the music, and the music listening history of the user A listening to the music.

Specifically, if a feeling related to an uplifting mood (for example, "excitement", "magnificence", etc.) is recorded in the feeling information Dg of the music, the photographic image selection unit 56 for highlight scene determines that the music meets the predetermined music condition.

Further, in general, it can be said that music that a listener newly experiences gives the listener a fresh feeling, thereby bringing an uplifting mood to the listener.

Whether or not the music being played during the photographing is fresh to the user A listening to the music can be determined based on whether the number of plays of the music is equal to or less than a predetermined number (including zero), and can also be determined based on the preference of the user A.

The preference indicates what kinds of music the user A prefers, and can be guessed based on the history of music that user A has listened to in the past (namely, the music playback information De). Furthermore, in general, since it is rare that a listener actively listens to music that is significantly different from his or her preference, it can be said that music that deviates from the preference to a degree higher than or equal to a predetermined value (the degree of deviation that is considered to be out of the preference) is likely to be music that the listener newly experiences, and is music that brings an uplifting mood to the listener.

Therefore, if the number of plays of music is equal to or less than the predetermined number (including zero), or the degree of deviation from the preference of the user A is equal to or greater than the predetermined value, the photographic image selection unit 56 for highlight scene determines that the music meets the predetermined music condition.

Then, the photographic image selection unit 56 for highlight scene identifies photographic images Da that were photographed when the music identified in step Sa3 was being played, among the photographic images Da acquired from the client equipment 12, based on the playback date and time De2 of the music, and the date and time of capture prerecorded in the photographic images Da, and selects these photographic images Da as the photographic images Da for use in creating the highlight scene Dc (step Sa4).

Consequently, the photographic images Da suitable for the highlight scene Dc are automatically selected. Thus, when the video generation unit 42 generates a video Db using the photographic images Da for the highlight scene Dc, the video Db that meets the expectation of the user A is generated.

According to the present embodiment, the following effects are achieved.

The video creation server 10 of the present embodiment includes: the photographic image acquisition unit 40 for acquiring a plurality of photographic images Da photographed with the on-vehicle camera 30; the music playback information acquisition unit 50 for acquiring the music playback information De that is information about music being played during the photographing of the photographic images Da; and the photographic image selection unit 56 for highlight scene, for selecting, based on the music playback information De, photographic images Da that were photographed when music meeting a predetermined music condition was being played.

According to this configuration, since the photographic images Da are automatically selected, it is possible to reduce the burden on the user A for the selection. In addition, as the photographic images Da, photographic images Da that were photographed when music meeting the predetermined music condition was being played are selected, and thus suitable photographic images Da are selected.

In the video creation server 10 of the present embodiment, the predetermined music condition includes a condition relating to the feeling information Dg about a feeling that a person listening to music gets.

According to this configuration, the photographic image selection unit 56 for highlight scene can automatically select photographic images Da that were photographed when the user A got a feeling same as or close to the feeling (an "uplifting mood" in the present embodiment) that the highlight scene Dc can give the viewer.

In the video creation server 10 of the present embodiment, the predetermined music condition includes a condition relating to information (for example, the number of plays, and preference of the user A) that is identified based on a playback history of music being played during the photographing.

According to this configuration, the photographic image selection unit 56 for highlight scene can automatically select photographic images Da that were photographed when the user A got a feeling same as or close to the feeling (an "uplifting mood" in the present embodiment) that the highlight scene Dc can give the viewer.

In the video creation server 10 of the present embodiment, the predetermined music condition includes a condition relating to the degree of deviation between the music being played during the photographing and the music preference of the user A listening to the music during the photographing.

According to this configuration, the photographic image selection unit 56 for highlight scene can automatically select photographic images Da that were photographed when the user A got a feeling same as or close to the feeling (an "uplifting mood" in the present embodiment) that the highlight scene Dc can give the viewer.

In the present embodiment, the on-vehicle camera 30 is mounted on the vehicle 2 in which the user rode, and the music during the photographing is music that was being played in the vehicle 2.

According to this configuration, the user A can automatically select suitable photographic images Da from among the photographic images Da photographed during driving in the vehicle 2.

In the present embodiment, the photographic image selection unit 56 for highlight scene selects photographic images Da from among the photographic images Da that were photographed during one cycle of the driving cycle of the vehicle 2.

According to this configuration, the user A can automatically select suitable photographic images Da from among the photographic images Da of a desired specific drive.

The video creation server 10 of the present embodiment includes the video generation unit 42 for generating a video Db, based on the photographic images Da selected by the photographic image selection unit 56 for highlight scene.

According to this configuration, the user A can easily create a video Db (for example, a memory video of a drive) using suitable photographic images Da.

Note that the above-described embodiment merely presents an example of one aspect of the present invention. In other words, the above-described embodiment can be arbitrarily modified and applied within the scope not departing from the gist of the present invention, and aspects of the embodiment, modifications, and applications can be arbitrarily combined.

(Modification 1)

In the above-described embodiment, for a determination about the predetermined music condition by the photographic image selection unit 56 for highlight scene, information about a situation during the photographing of the photographic images Da may be used.

More specifically, a mood of the user A during the photographing can be inferred from the situation in the photographing. In particular, the mood of the user A during driving in the vehicle 2 is easily affected by environmental information around the vehicle 2 (such as scenery, weather, and hours), travel information related to traveling of the vehicle 2 (such as the traveling speed, current location, and traveling location (area), the type of road (such as a general road, and an expressway) on which the vehicle 2 is traveling, and a congestion state.

Therefore, the mood of the user A during the photographing can be identified based on at least one of these environment information and traveling situation. Note that these environment information and travel information are information that can be recorded by an appropriate on-vehicle device of the vehicle 2 (such as an on-vehicle ECU, and an on-vehicle camera).

Then, the video creation server 10 acquires, from the client equipment 12 which fetched the environment information and travel information from the vehicle 2, these environment information and travel information (movement information).

Next, when determining "music that makes a listener feel an uplifting mood" which is a predetermined music condition for a highlight scene Dc, first, the photographic image selection unit 56 for highlight scene determines, based on at least one of the environment information and the travel information, whether or not the situation during the photographing is a situation that can put the user A in an uplifting mood.

Then, when the situation during the photographing is a situation that can put the user A in an uplifting mood, if a feeling related to the "uplifting mood" is recorded in the feeling information Dg about the music being played at that time, or, in other words, if music suitable for the situation in the photographing was being played, the photographic image selection unit 56 for highlight scene determines that the music meets the predetermined music condition.

Thus, it is possible to more accurately select photographic images Da suitable for the highlight scene.

(Modification 2)

In the above-described embodiment and modification, the predetermined music condition preset for the highlight scene Dc may include a condition that "the music being played during the photographing is music selected based on the travel information on the vehicle 2".

Specifically, the music playback device 32 of the vehicle 2 according to this modification includes travel information means for acquiring the travel information from an appropriate on-vehicle device of the vehicle 2, and music selection means for selecting music corresponding to the travel information, and is configured to play music suitable for the traveling situation of the vehicle 2 by playing the music acquired by the music selection means. Moreover, when the music playback device 32 plays the music selected by the music selection means, music selection information indicating that the music was played based on the travel information is recorded in the music playback information De.

When determining the predetermined music condition (step Sa3 in FIG. 4), the photographic image selection unit 56 for highlight scene determines, based on the music selection information in the music playback information De, whether or not the music subject to the determination meets the condition that "the music being played during the photographing is music selected based on the travel information on the vehicle 2".

According to the present modification, when the music selected based on the travel information was being played, it is determined that the music meets the predetermined music condition, and thus it is possible to more accurately select photographic images Da suitable for the highlight scene.

(Modification 3)

In the above-described embodiment and modifications, the predetermined music condition preset for the highlight scene Dc may include a condition that "the degree of matching between the music being played during the photographing and the travel information on the vehicle 2 is equal to or greater than a predetermined value".

The degree of matching is the degree of similarity between a feeling that a person gets from the traveling situation indicated by the travel information on the vehicle 2 and a feeling that the person listening to the music gets. Specifically, when the degree of matching between the music and the travel information is equal to or greater (i.e., higher) than the predetermined value, it can be said that the music has a deep relationship with the driving situation at that time.

The music playback device 32 of the vehicle 2 according to the present modification includes the travel information means for acquiring the travel information from an appropriate on-vehicle device of the vehicle 2, and matching determination means for determining the degree of matching between a first feeling that a person listening to music gets for the music being played at that time and a second feeling that the person gets from the traveling situation indicated by the travel information, and records the degree of matching in the music playback information De.

Further, when determining the predetermined music condition (step Sa3 in FIG. 4), the photographic image selection unit 56 for highlight scene determines, based on the music selection information in the music playback information De, whether or not the degree of matching between the music subject to the determination and the travel information on the vehicle 2 is equal to or greater than a predetermined value.

According to the present modification, when music having a high degree of matching with the traveling situation indicated by the travel information, that is, music suitable for the traveling situation, is being played, it is determined that the music meets the predetermined music condition, and thus it is possible to more accurately select photographic images Da suitable for the highlight scene.

(Modification 4)

In the above-described embodiment, the photographic images Da are described as an example of captured images, but the captured images may be captured videos in a video format.

(Modification 5)

In the above-described embodiment, the vehicle 2 as one example of a moving object has an arbitrary number of wheels, and may be a four-wheeled vehicle or a two-wheeled vehicle. Further, the moving object is not limited to the vehicle 2, and may be, for example, a ship, a drone, a robot, etc. as long as the moving object allows the user A to ride thereon, and is capable of moving.

(Modification 6)

In the above-described embodiment, as a process to be performed after selecting a plurality of photographic images Da (captured images) by the photographic image selection unit 56 for highlight scene, the video generation unit 42 generates a video Db based on the plurality of captured images. However, in addition to generating the video Db, or instead of generating the video Db, after selecting a plurality of photographic images Da (captured images) by the photographic image selection unit 56 for highlight scene, an information processing unit, not shown, may upload the photographic images Da (captured images) to a predetermined folder or a server, or create an electronic album.

(Other Modification)

In the above-described embodiment, the function of the video creation server 10 to create a video may be integrated with the client equipment 12. This integration may be implemented by causing the client equipment 12 to execute a computer program for realizing the function of the video creation server 10 to create a video.

In the above-described embodiment, the video creation server 10 may be a video creation device configured using a non-server computer.

The drawings showing the functional configurations of the above-described embodiment and modifications are schematic diagrams showing components classified according to major processing contents for ease of understanding of the invention, and these components can be classified into a greater number of components according to the processing contents. Further, it is also possible to classify a single component to execute a greater number of processing operations.

(Configurations Supported by the Disclosure of the Present Specification)

The disclosure of the present specification supports the following configurations.

(Configuration 1)

An image processing device including: a captured image acquisition unit for acquiring a plurality of captured images photographed with a photographic device; a music playback information acquisition unit for acquiring music playback information that is information about music being played during photographing of the captured images; and a captured image selection unit for highlight scene, for selecting, from among the plurality of captured images, based on the music playback information, captured images that were photographed when music meeting a predetermined music condition was being played.

According to configuration 1, it is possible to automatically select suitable photographic images, and reduce the burden on the user.

(Configuration 2)

The image processing device according to configuration 1, wherein the predetermined music condition includes a condition related to feeling information about a feeling that a person listening to the music gets.

According to configuration 2, suitable photographic images can be more accurately and automatically selected.

(Configuration 3)

The image processing device according to configuration 2, wherein the captured image selection unit for highlight scene determines the predetermined music condition, based on information about a situation during the photographing.

According to configuration 3, suitable photographic images can be more accurately and automatically selected.

(Configuration 4)

The image processing device according to any one of configurations 1 to 3, wherein the predetermined music condition includes a condition related to information identified based on a playback history of the music being played during the photographing.

According to configuration 4, suitable photographic images can be more accurately and automatically selected.

(Configuration 5)

The image processing device according to any one of configurations 1 to 4, wherein the predetermined music condition includes a condition related to a degree of deviation between the music being played during the photographing and a music preference of a user listening to the music during the photographing.

According to configuration 5, suitable photographic images can be more accurately and automatically selected.

(Configuration 6)

The image processing device according to any one of configurations 1 to 5, wherein the photographic device is mounted on a moving object, and the music during the photographing is music being played in the moving object.

According to configuration 6, it is possible to automatically select suitable photographic images from among the photographic images photographed when the user was riding the moving object and moving.

(Configuration 7)

The image processing device according to configuration 6, wherein the captured image selection unit for highlight scene selects captured images from among the captured images that were photographed during one cycle of a driving cycle of the moving object. According to configuration 7, the user can automatically select suitable photographic images from among the photographic images about a desired specific move.

(Configuration 8)

The image processing device according to configuration 6 or configuration 7, wherein the predetermined music condition includes a condition that the music being played during the photographing is music selected based on movement information about a movement of the moving object.

According to configuration 8, suitable photographic images can be more accurately and automatically selected from among the photographic images photographed when the user was riding the moving object and moving.

(Configuration 9)

The image processing device according to any one of configuration 6 to 8, wherein the predetermined music condition includes a condition that a degree of matching between the music being played during the photographing and the movement information about the moving object is equal to or greater than a predetermined value.

According to configuration 9, suitable photographic images can be more accurately and automatically selected from among the photographic images photographed when the user was riding the moving object and moving.

(Configuration 10)

The image processing device according to any one of configurations 1 to 9, including a video generation unit for generating a video, based on the captured images selected by the captured image selection unit for highlight scene.

According to configuration 10, it is possible to easily create a video using suitable photographic images.

(Configuration 11)

An image processing method to be performed by an image selection device having a captured image acquisition unit for acquiring a plurality of captured images photographed with a photographic device, the image processing method including: a step for acquiring music playback information that is information about music being played during photographing of the captured images; and a step for selecting, from among the plurality of captured images, based on the music playback information, captured images that were photographed when music meeting a predetermined music condition was being played.

According to configuration 11, it is possible to automatically select suitable photographic images, and reduce the burden on the user.

REFERENCE SIGNS LIST

1 Video creation system
2 Vehicle (moving object)
10 Video creation server (image processing device)
12 Client equipment
30 On-vehicle camera (photographic device)
40 Photographic image acquisition unit (captured image acquisition unit)
42 Video generation unit
44 Video output unit
50 Music playback information acquisition unit
52 Driving cycle information acquisition unit
54 Feeling information storage unit
56 Photographic image selection unit for highlight scene (captured image selection unit for highlight scene)
Da Photographic image (captured image)
Db Video
Dc Highlight scene
De Music playback information
Df Driving cycle information
Dg Feeling information

What is claimed is:

1. An image processing device comprising a computer, wherein the computer functions as:
 a captured image acquisition unit for acquiring a plurality of captured images photographed with an on-vehicle camera that photographs surroundings and an interior of a vehicle;
 a music playback information acquisition unit for acquiring music playback information that is information about music being played in the vehicle during photographing of the captured images, and for storing the music playback information in a memory; and
 a captured image selection unit for highlight scene, for selecting, from among the plurality of captured images, based on the music playback information, captured images that were photographed when music meeting a predetermined music condition was being played, wherein
 the music playback information includes feeling information about a feeling that a person listening to the music gets, and
 the captured image selection unit for highlight scene:
  obtains, from an on-vehicle device, travel information including traveling speed of the vehicle, a current location of the vehicle, a type of road of traveling, and a congestion state of the road of traveling;
  for each of the plurality of captured images, determines, at a timing when each of the plurality of captured images are photographed, whether or not a situation during the photographing is a situation that can put a user of the vehicle in an uplifting mood based on environmental information and the travel information, the environmental information including scenery and weather around the vehicle, as well as a time; and
  determines that the music meeting the predetermined music condition is being played when the situation during the photographing is the situation that can put the user in the uplifting mood, and the feeling related to the uplifting mood is recorded in the feeling information about the music being played at that time.

2. The image processing device according to claim 1, wherein the predetermined music condition includes a condition related to a degree of deviation between the music being played during the photographing and a music preference of the user listening to the music during the photographing.

3. The image processing device according to claim 1, wherein the captured image selection unit for highlight scene selects captured images from among the captured images that were photographed during one cycle of a driving cycle of the vehicle.

4. The image processing device according to claim 1, wherein the predetermined music condition includes a condition that the music being played during the photographing is music selected based on movement information about a movement of the vehicle.

5. The image processing device according to claim 1, wherein the predetermined music condition includes a condition that a degree of matching between the music being played during the photographing and movement information about the vehicle is equal to or greater than a predetermined value.

6. The image processing device according to claim 1, wherein the computer functions as a video generation unit for generating a video, based on the captured images selected by the captured image selection unit for highlight scene.

7. An image processing method to be performed by a computer for acquiring a plurality of captured images photographed with an on-vehicle camera that photographs surroundings and an interior of a vehicle and for selecting captured images, the image processing method comprising:
 a step for acquiring music playback information that is information about music being played in the vehicle during photographing of the captured images, and for storing the music playback information in a memory; and
 a step for selecting, from among the plurality of captured images, based on the music playback information, captured images that were photographed when music meeting a predetermined music condition was being played, wherein
 the music playback information includes feeling information about a feeling that a person listening to the music gets, and
 the step for selecting includes:
  obtaining, from an on-vehicle device, travel information including traveling speed of the vehicle, a current location of the vehicle, a type of road of traveling, and a congestion state of the road of traveling;
  for each of the plurality of captured images, determining, at a timing when each of the plurality of captured images are photographed, whether or not a situation during the photographing is a situation that can put a user of the vehicle in an uplifting mood based on environmental information and the travel information, the environmental information including scenery and weather around the vehicle, as well as a time; and determining that the music meeting the predetermined music condition is being played when the situation during the photographing is the situation that can put the user in the uplifting mood, and the feeling related to the uplifting mood is recorded in the feeling information about the music being played at that time.

* * * * *